United States Patent [19]

Gantwerker et al.

[11] 4,438,150
[45] Mar. 20, 1984

[54] PROCESS FOR PREPARING AN INSTANT BABY CEREAL PORRIDGE PRODUCT

[75] Inventors: Scott Gantwerker, LaGrange; Sai Leong, Buffalo Grove, both of Ill.

[73] Assignee: The Quaker Oats Company, Chicago, Ill.

[21] Appl. No.: 416,190

[22] Filed: Sep. 9, 1982

[51] Int. Cl.³ .......................... A23L 1/10; A21D 8/06
[52] U.S. Cl. .................................. 426/625; 426/457; 426/458; 426/464; 426/640; 426/801; 426/619; 426/620
[58] Field of Search ............... 426/640, 619, 622, 625, 426/457, 458, 464, 801, 52, 518; 127/29, 32

[56] References Cited

U.S. PATENT DOCUMENTS

| 2,727,822 | 12/1955 | Kimball et al. | 426/619 |
| 2,999,018 | 9/1961 | Huffman et al. | 426/620 |
| 3,133,818 | 5/1964 | Gould et al. | 426/464 |
| 3,704,134 | 11/1972 | Ronai et al. | 426/619 |
| 3,887,714 | 6/1975 | Kelly et al. | 426/457 |

*Primary Examiner*—Raymond N. Jones
*Assistant Examiner*—Elizabeth J. Curtin
*Attorney, Agent, or Firm*—Karen E. Ayd

[57] ABSTRACT

This invention relates to a process for preparing a dehydrated, readily reconstitutable (i.e. "instant") baby cereal porridge product from a reduced-viscosity, gelatinized, cereal flour-water mixture. The reduction in viscosity of the gelatinized cereal flour-water mixture is achieved by a method in which a cereal flour-water slurry having flour solids content in the range 14% to 30% inclusive, is gelatinized and then subjected to a mechanical shearing action. In preferred embodiments one of the cereal flour ingredients in the slurry is oat flour.

7 Claims, No Drawings

PROCESS FOR PREPARING AN INSTANT BABY CEREAL PORRIDGE PRODUCT

BACKGROUND OF THE INVENTION

Instant cereal porridges, which are packaged as dry cereal flakes and which are readily reconstitutable upon the addition of water or milk to yield a cereal porridge having a "cooked" texture, have become increasingly popular with consumers. Instant porridges are favored by consumers because the amount of preparation and cleanup required to prepare conventional hot cereal porridges is considered burdensome. Thus, "instant" preparation of a porridge which requires merely the addition of water or milk directly to dried cereal flakes or beads to rehydrate and reconstitute the flakes or beads, alleviates most of the deterrent aspects of porridge preparation.

U.S. Pat. No. 2,999,018 issued to G. W. Huffman et al. discloses an instant rolled oatmeal cereal porridge. In accordance with the Huffman et al. patent the "instant cooked" character is provided to the rolled oats by the addition of an edible polysaccharide gum in sufficient amount to produce a cooked flavor and texture but insufficient to produce a pasty texture upon the addition of water. The addition of the edible polysaccharide gum to the oat flakes provides a gelatinized "cooked" quality uniformly to the cereal without actual gelatinization of the oat starches.

While addition of the polysaccharide gum is satisfactory for the purposes of adult feeding, it is not suitable for the preparation of an instant baby cereal porridge. It is essential for infant digestion, that the cereal grains or flours contained within a baby cereal be completely gelatinized prior to ingestion by the infant. Conventional preparation of a non-enzyme-containing, baby cereal involves a time-consuming in-home cooking step to assure that all the starch is completely gelatinized, prior to feeding of the infant. Therefore, a completely pregelatinized cereal porridge suitable for infant feeding, in which the "cooked" quality is apparent immediately upon rehydration of the dry cereal product with milk or water, is desirable from a consumer viewpoint. However, it is essential that such an instant cereal contain only flour starches which have been completely gelatinized prior to the drying and packaging thereof.

When cereal flour-water slurries are gelatinized the gelatinization process results in an increase in the viscosity of the cereal flour-water mixture. The increase of viscosity adds to the difficulty in further processing of the gelatinized mixture, particularly with regard to the drying of the mixture by drum drying.

Heretofore, treatment of the gelatinized mixture with enzymes has been a preferred method for reducing the viscosity of the gelatinized cereal mixture. Treatment with the enzyme reduces the viscosity of the gelatinized mixture by breaking down the cereal starch molecules, thereby decreasing the average molecular weight of the gelatinized starch molecules. However, enzyme treatment, in reducing the molecular weight of the starches, commonly result in sufficiently high glucose levels that upon drum drying, or upon the use of other highly efficient industrial drying methods, the dried product has an off-color due to browning reactions between the cereal proteins and the glucose, and also results in flake product densities which are too high for conventional product usage. Additionally, the enzyme treatment commonly decreases the viscosity of the reconstituted cereal porridge, yielding a "watery" porridge, and in extreme cases yielding a "porridge" which is merely a suspension of cereal in water or milk and in which the dry product tends to settle out of the water or milk during the rehydration process. For the reasons stated earlier, the enzyme treatment results in a darkening of the final dehydrated cereal product as well as of the reconstituted porridge made therefrom (particularly when the cereal flour contains oats).

Instant cereal porridge products intended for baby food use desirably must be superior in appearance when compared to conventionally prepared adult porridges in order to meet most consumers expectations. Darker color cereal products are generally perceived by the consumer as unappealing. Thus a darker color product is undesirable from both a consumer and marketing viewpoint. Bleaches and acids can be employed to lighten the color of the final instant porridge product, however, these chemical additives tend to degrade the protein contained in the cereal flours. Additionally, bleach and acid additives produce off-flavor notes, such as a rancid flavor or an "acid-bite". Processing of a cereal product by addition of an enzyme, bleach, or acid additives can be both costly and time-consuming. Moreover, consumer resistance to the addition of such not-found-in-nature additives to natural foods is becoming increasingly strong and the use of such additives, unless there is no reasonable natural alternative, is to be avoided.

However, some means to reduce the viscosity (and thus increase the fluidity) of the gelatinized cereal flour-water mixture is necessary to facilitate further processing and handling of the gelatinized mixture by drum drying or other drying methods. Uniformly drying of a gelatinized cereal flour-water mixture by drum drying in an efficient, industrially acceptable process requires an even coating of the drum by the cereal-water mixtures. Highly viscous gelatinized cereal flour-water mixtures are generally regarded as unsuited to drum dry techniques because they do not provide an even coating on the drums. Thus, a drastic reduction in viscosity from the peak gelatinization viscosity is necessary to provide the fluidity of the mixture which is essential for an even, uniform coating on the drum dryer. The drum drier capacity and efficiency will also be improved because the heat transfer is increased when the viscosity is lower.

The addition of oat flour to a baby cereal porridge is advantageous because oats have the highest protein content of any grain. And yet, this advantage makes oat flour particularly susceptible to browning reactions when processed in the presence of sugars. Nonetheless, the protein content of the porridge product can be enhanced by the addition of oats to the product. For instance, the protein content of a cereal product can be raised approximately 2-4% higher than the conventional porridges currently available to the consumer by the addition of a substantial amount of oat flour. Typical cereal porridge products which do not contain oat flour have a protein content in the range 8-11% protein based on the weight of the product. In accordance with a preferred process of the present invention, in which a substantial level of oat flour is employed as an ingredient, the protein level of the resulting dry product is approximately 12-14% protein based on the weight of the final dried product.

When oat flour is employed as one of the cereal flours, enzyme treatment (not in accordance with this invention), intensifies the dark color of the flake product and the porridge made therefrom. Bleaching or acid treatment of the dark oat-containing cereal product is disadvantageous because (a) it degrades the protein contained in the oats, and (b) it produces off-flavors, and (c) for the other reasons stated above.

A 1964 U.S. Pat. No. 3,133,818 issued to Gould et al discloses a process for precooking a substantially water-insoluble farinaceous product in which the farinaceous particles consisting of finely divided, highly dispersed particles of dry flour are "fluidized by contact with steam gas." The resulting "precooked" product (i.e. product which contacted heat source steam gas for period of about 2 to 200 seconds), prior to drying, has a moisture content in the range 15 to 50% by weight wet basis. There is no teaching or suggestion in the Gould patent of a process for mechanically imparting shear to a completely gelatinized, high moisture (greater than 70%) cereal flour-water mixture to reduce the viscosity of the mixture.

OBJECTS OF THE INVENTION

It is an object of this invention to produce a dehydrated, readily reconstitutable cereal porridge product by a drum drying method from a gelatinized cereal flour and water mixture having a reduced viscosity, without the addition of chemical agents or enzymes.

It is a further object to produce dry cereal flakes which upon rehydration yield a porridge product having a viscosity typical of conventional cooked cereal porridges.

It is a further object of this invention to provide a reduced viscosity gelatinized cereal flour and water mixture which can be held at a temperature of about 170°–200° F. for approximately 3 or more hours without a significant decrease in fluidity or viscosity and which is thus suitable for processing by drum drying. It is a further object to provide a reduced viscosity gelatinized flour and water mixture which retains its fluidity after being held at a temperature of 170° to 200° F. for up to 3 hours.

It is a further object of a preferred embodiment of this invention to provide a high protein, instant porridge cereal which contains 12–14% protein.

It is a further object of a preferred embodiment of this invention to provide a process for producing a readily rehydratable cereal porridge product containing a substantial amount of oat flour, wherein the process does not require the use of either bleaches or other chemical additives or agents to lighten the color or increase the density of the dehydrated cereal flakes, or to adjust the viscosity of the rehydrated porridge.

It is a further object of this invention to provide a gelatinized cereal flour and water mixture which has a reduced viscosity which makes it suitable for dehydrating by drying on the surface of a drum drier. The reduced viscosity (i.e. relatively fluid) gelatinized flour and water mixture yields a good wetting of the drum surface, thus resulting in increased capacity on the drum.

SUMMARY OF THE INVENTION

This invention relates to a process for producing an instant baby cereal porridge product from a fluid, reduced-viscosity, gelatinized cereal flour and water mixture by drum drying. The viscosity of the gelatinized cereal flour-water mixture is reduced by mechanically shearing the gelatinized mixture after the peak gelatinization viscosity has been achieved. The fluidity of the mixture is increased as the viscosity is reduced.

The process of this invention for preparing the dry, gelatinized, instant cereal porridge product comprises:

a. preparing a slurry or suspension of cereal flour in water, wherein the flour has a U.S. Mesh size less than U.S. Mesh size #40 and wherein the flour is present in an amount of from 14% to 30% inclusive based on the weight of the slurry;

b. gelatinizing the cereal flour-water slurry by heating until the gelatinized cereal flour-water mixture has achieved a temperature in the range 180°–212° F. inclusive and the viscosity of the gelatinized cereal flour-water mixture is greater than 20,000 cps as measured on a RVT Brookfield viscometer at 50 rpm using spindle #7;

c. subjecting the gelatinized cereal flour-water mixture to mechanical shear of sufficient intensity and duration to reduce the viscosity of the gelatinized cereal flour-water mixture to a viscosity less than 10,000 cps, as measured on a RVT Brookfield viscometer at 50 rpm using spindle #5; and d. dehydrating the reduced viscosity gelatinized cereal flour-water mixture by drum drying to yield a dehydrated cereal material having a moisture of less than 9% based the weight of the material and pulverizing the dehydrated cereal material to produce a dry, gelatinized cereal porridge product capable of being instantly prepared as a hot or cold cereal porridge.

In accordance with the present invention a slurry of cereal flour in water is heated until complete gelatinization of the flour starch has been accomplished. The gelatinized cereal flour-water mixture is subjected to mechanical shear of sufficient intensity and duration to reduce the viscosity of the gelatinized mixture, and the mixture is then applied to the surface of a drum drier to dehydrate the water therefrom.

The cereal flour-water slurry of the present invention is a mere suspension of flour in water, having a viscosity approximately the viscosity of water (e.g. typically less than 100 cps). When the slurry is heated to the gelatinization temperature (e.g. 140° to 185° F.) the viscosity of the gelatinized cereal flour-water mixture reaches a peak viscosity (approximately 30,000 to 70,000 cps or more) and then drop due to the heating. The gelatinized cereal flour-water mixture can be described as a "thixotropic gel," which becomes more fluid upon agitation. Continued heating further reduces the viscosity. In accordance with the present invention, the cereal flour-water mixture is cooked through its peak gelatinization viscosity until the viscosity is less than half of the peak viscosity. The gelatinized cereal flour-water mixture is then subjected to mechanical shear of sufficient duration and intensity to reduce the viscosity to less than 10,000 cps. In preferred embodiments of the present invention, during the heat-up to gelatinization temperature portions of the cereal flour-water mixture are continuously cycled through the mechanical shear means and then recirculated back into the cooking vessel in which the cereal flour-water mixture is being cooked to gelatinization. Recirculation results in a continuous reduction in the viscosity of the mixture in the cooking vessel.

The cereal flour suitable for use in accordance with the present invention is any cereal flour having a U.S. Mesh size less than U.S. Mesh size 30. In preferred embodiments the U.S. Mesh size is less than size 40. Any cereal grain flour is suitable for use in accordance with the present invention. Such flours include, for example, flours from wheat, rice, oats, barley, and corn. In preferred embodiments a substantial level of oat flour, (e.g. at least 20% based on the weight of the flour ingredient) is employed to improve the protein content of the cereal porridge product. Oat grain is the grain having the highest protein content, and thus the final dry instant cereal porridge product will have a high protein content (e.g. 12–14% based on the weight of the dry product) when a relatively high level of oat flour is incorporated therein.

The cereal flour and water slurries suitable for use in accordance with the present invention have a cereal flour content of from 14% to 30%, inclusive, based on the weight of the slurry. A more preferred flour content is in the range 15% to 20% based on the weight of the slurry.

The cereal flour slurry or suspension is prepared by admixing water with the cereal flour. Clumping or lumping of the flour in water can be avoided during admixing by metering the flour into water at approximately room temperature with continuous agitation.

The slurry of cereal flour and water is heated to gelatinize the cereal starch granules. Typically some gelatinization begins to occur at temperatures approximately 140° F.–160° F. The gelatinization of all starch granules is complete when the cereal flour water mixture is at a temperature greater than 185° F. Because complete gelatinization is essential to the processing of a baby cereal, it is preferable that the temperature of the cereal flour mixture be maintained between 180°–200° F. for a time period sufficient to ensure complete gelatinization of all the starch granules within the cereal flour. Maintenance of the mixture at temperatures higher than the gelatinization temperatures has additional benefits, including the minimization of microbial growth, a greater reduction in the cereal viscosity (viscosity is also a function of temperature) and improved drum drier efficiency and capacity.

Any suitable means may be used to heat and cook the cereal flour-water slurry. Such heating means must raise the temperature of the gelatinized cereal flour-water mixture to the gelatinization temperature for a sufficient time period to yield a cereal flour-water mixture in which all flour starch granules are completely gelatinized. For example, injection of steam directly into the slurry, heating of the vessel in which the slurry is being cooked, or jet cooking may be employed to gelatinize the slurry. Once the starch granules in the flour have been completely gelatinized the viscosity of the gelatinized cereal flour-water mixture will reach a peak viscosity in the range 30,000 to 70,000 cps or more then abruptly decrease with increasing temperature. The temperature viscosity when the temperature reaches 200° F., typically is less than 30,000 cps (as measured on a RVT Brookfield viscometer at 50 rpm using spindle #7) and the mixture is a thixotropic gel.

In preferred embodiments, during the cooking step the viscosity of the cereal flour-water mixture is reduced by continuously cycling the mixture from the cooking vessel through a mechanical shear means and then recyling the reduced viscosity mixture back into the cooking vessel. Thus, a higher heat transfer co-efficient within the heated slurry is achieved, and the viscosity is more rapidly reduced from the peak gelatinization viscosity.

Mechanical shear can be provided to the gelatinized cereal flour-water mixture by any means which provides reduction of viscosity to less than 10,000 cps (preferrably to a viscosity in the range 2,000 to 6,000 cps) and thus increases the fluidity of the gelatinized mixture. Conventional low shear pumps and agitators which merely transport or blend mixtures do not provide sufficient shear to reduce the viscosity of the gelatinized mixtures to less than 10,000 cps and thus are not suitable for use in accordance with the present invention. Shear means suitable for use in accordance with the present invention include, but are not limited to:

(a) high speed shear impellers or pumps rotating at speeds in the range 1000–3500 rpm, preferably 2000–3500 rpm, (e.g. Tri-Blender by Ladish Company, Tri-Clover Division);

(b) homogenizers (e.g. Oakes Mixer by Oakes Machine Corp.); and (c) high speed agitators, mixers, or turbines, (e.g. the "Likwifier" turbine mixer by Lanco and the mixers and aerators by "Lightnin" Co.).

While mechanical shear can be provided by any suitable means, the shearing must be of sufficient intensity and duration to reduce the viscosity of the gelatinized slurry from a viscosity greater than 20,000 cps as measured on a RVT Brookfield viscometer at 50 rpm using spindle #7 to a viscosity less than 10,000 cps as measured on a RVT Brookfield viscometer rotating at 50 rpm using spindle #5.

Once sufficient mechanical shear has been imparted to the gelatinized cereal flour-water mixture the slurry may be held with mixing at a temperature in the range of 170°–200° F. for 3 hours or more without a significant change in viscosity. Thus, it is possible to hold a gelatinized cereal flour-water mixture without the need for additional processing prior to application to the drum drier.

After the viscosity has been reduced by mechanical shear to less than 10,000 cps as measured on a RVT Brookfield viscometer spindle #5, the cereal flour-water mixture is fluid and can easily and uniformly be applied on the surface of a conventional drum drier to dehydrate the water from the mixture. The purpose of drum drying is to remove water from the cereal flour-water mixture without substantially effecting the color, density and reconstitution properties of the final dry cereal product. Because, in accordance with the present invention, the starch granules in the cereal flour-water mixture are completely gelatinized prior to being applied to the drum drier, there is no need to use the drum drier to complete the cooking step. Typically, in conventional drum drying processes, the cooking is accomplished during drying.

Although a single drum drier is eminently suitable for use in accordance with the present invention, in preferred embodiments a double drum drier is employed. When double drum driers are employed, the use of conventional spreader or applicator rolls to increase the utilization of the drier surface and increase the dry cereal sheet thickness is preferred.

Because of the increase in fluidity which is associated with the reduction in viscosity of the gelatinized cereal flour-water mixture, the operation of the double drum drier (particularly the spacing between drums) must be adjusted to yield the desired final porridge product characteristics, such as color, density, and reconstitutability. Such adjustments in the drum drier operating parameters are within the sphere of conventional techniques.

Film thickness depends upon the space or gap between drums. Other drum drier operating parameters which are significant include drum speed, steam pressure for heating the inside of the drums, the depth of the "puddle" of cereal flour-water mixture situated on the drum, the temperature of the mixture to be fed onto the drum and the location of the doctor or scraper blades. The drum drier operating parameters set forth herein are illustrative of conventional techniques suitable for use in accordance with this invention and are not intended to unduly limit the novel aspects of the invention. The operating parameters set forth herein are based on a conventional 12 inch radius double drum drier, however other types of drum driers may be employed with some modification of the operating parameters.

The gap or space between the drums of a double drum drier suitable for use in accordance with the present invention is relatively narrow due to the fluidity of the reduced viscosity cereal flour-water mixture. Double drum drier gaps in the range 0.007 to 0.020 inches are suitable. A gap in the range 0.009 to 0.015 is more preferred, with an optimum gap being in the range 0.011 to 0.013 inches.

In accordance with the present invention, a drum speed in the range 4 rpm to 10 rpm is suitable to produce a satisfactory cereal porridge product. However, speeds in the range 6 to 9 rpm are more preferred, with the range 7 rpm–8 rpm being most preferred.

The steam pressure within the drum can be in the range 50 to 100 psig inclusive, and more preferrably in the range 65 to 80 psig. The optimum steam pressure for use in accordance with the present invention is in the range 70 to 75 psig.

Because the color, density and reconstitution characteristics of the final dry cereal porridge product are dependent to a large degree on the length of time that the cereal flour-water mixture remains in contact with the heated drum surface, it is preferred that the "puddle" of cereal flour-water mixture which wets the drum be maintained at a controlled depth. Depth is measured from the narrowest point (e.g. gap) between the surfaces of the two drums to the top of the puddle. In preferred operations the puddle depth is 4 to 10 inches inclusive, and optimally 7 to 9 inches.

Although it is not essential, to maximize the fluidity of cereal flour-water mixture and to minimize the drum contact time, the mixture is at a temperature in the range 165° to 200° F. when fed to the puddle on the drum. A preferred feed temperature to the drum is 170° to 185° F.

The cereal flour-water mixture is applied to wet the surface of the heated rotating drier drums. The mixture forms a continuous sheet on the surface of the drums as the moisture evaporates from the mixture. The sheet is removed from the drum by "conventional scraper" or "doctor" blade. The blades are preferably located at the "10 o'clock" and "2 o'clock" position on the drum. The dried sheet will preferably have a thickness of 0.001 inches to 0.003 inches and a moisture content in the range 2 to 9% (preferably less than 6%) based on the weight of the sheet, when it is scraped from the drum surface.

The dried cereal sheet is then pulverized into flakes by any conventional means. For instance, the sheet may be pulverized by a flaker having ¼ inch screen size to yield particles ranging in size from ⅛ inch to U.S. Mesh #7. These particles may be further pulverized by grinding through a 1 mm screen until all flakes have a U.S. Mesh less than 40. The flakes prepared by the method of the present invention preferably have a density in the range 0.25 to 0.30 gr/ml and a color (as measured on a Hunter Colorimeter) greater than 79.

The dried cereal flakes thus prepared may be reconstituted by addition of water or milk (either hot or cold). Upon reconstitution, the cereal porridge has a viscosity typical of conventionally prepared cereal porridge products, e.g. 500–1800 cps as measured on a RVT Brookfield viscometer spindle #2 at 20 rpm. Preferably the porridge viscosity range is 900–1800 cps.

The following examples are provided to illustrate the present invention and to provide a comparison of the process of this invention with conventional cereal preparation processes. These examples are not intended to limit the invention.

EXAMPLE I

This example illustrates the effect of mechanical shear on the viscosity of a gelatinized cereal flour-water mixture.

In Test I-A, which is in accordance with a preferred embodiment of this invention, portions of the cereal flour-water mixture are continuously subjected to mechanical shear and recycled back into the heating vessel during the gelatinization process. After all of the flour starch is gelatinized, the entire gelatinized mixture is subjected to mechanical shear as it is pumped from the heating vessel to ensure that all of the mixture has been subjected to shear.

In Test I-B the Cereal flour-water slurry is heated to gelatinization without subjecting it to shear. After complete gelatinization, the gelatinized cereal flour-water mixture is subjected to mechanical shear as it is pumped from the heating vessel. Thus, this test is also in accordance with the present invention.

In each test, a cereal flour-water slurry is prepared as follows: 50 pounds of cereal flour (containing 34% oat flour, 33% wheat flour, and 33% rice flour having a U.S. Mesh size less than 30, is thoroughly admixed with 2.7 pounds of dicalcium phosphate dihydrate and 200 pounds of water. After mixing, the respective slurries are cooked separately in a steam jacketed vessel by steam injection directly into the cereal flour-water mix. The vessel jacket is maintained at a pressure 20 psig steam. The injected steam is maintained at pressure 50 psig until the temperature reaches 170° F., and is then reduced to 5 psig until the cereal flour-water mixture reaches 200° F. A viscosity increase is noted at approximately 140° F. to 185° F.

During the cooking process for Test I-A, the cereal flour-water mixture is continuously cycled from the cooking vessel through a high speed impeller pump (the Tri-Blender by Ladish Co.) which subjects the mixture to mechanical shear. After shearing, the mixture is recycled back into the cooking vessel. When the gelatinization process is complete, the gelatinized cereal flour-water mixture is transferred out of the heating vessel through the Tri-Blender, to once again subject the mixture to mechanical shear.

In Test I-B, the cereal flour-water mixture is not cycled through the Tri-Blender during the cooking process. However, once the gelatinization process is complete the gelatinized cereal flour-water mixture is transferred from the cooking vessel through the Tri- Blender which subjects the mixture to mechanical shear to reduce the viscosity of the mixture.

In each test, the viscosity of the cereal flour-water mixture is measured on a RVT Brookfield viscometer at 20 rpm and 50 rpm using the spindles listed on Table I. To measure the viscosity approximately 1000 milliliters of the cereal flour-water mixture is poured into a beaker and a viscometer spindle is placed in the approximate center of the mass. A viscosity reading is taken after one minute.

The moisture of the gelatinized cereal flour-water mixtures of Test I-A and I-B are tested using a Computrak Moisture Analyzer. For each test approximately 10 grams of the gelatinized cereal flour-water mixture at 200° F. is placed on a disc in the Analyzer. The Analyzer measures the amount of moisture flashed-off per sample weight. The moisture content of the sample from Test I-A is 83.1% and the moisture of Test I-B is 82.5%.

The viscosity data listed on Table I indicates that mechanical shear drastically reduces the viscosity of the gelatinized cereal flour-water mixture. In particular it should be noted that in Test I-B the viscosity is greatly reduced by subjecting the mixture to mechanical shear by the Tri-Blender only as it is pumped from the cooking vessel (see data under heading "200° (after final shear)").

TABLE I

| Temperature (°F.) | Spindle # | Viscosity (cps) at 20 rpm | at 50 rpm |
|---|---|---|---|
| Test I-A | | | |
| *100° | #1 | 29 | 34 |
| *170 | #7 | 31,400 | 22,400 |
| *185 | #7 | 60,000 | 32,960 |
| *200 | #6 | 12,500 | 6,920 |
| *200 (after final shear) | #6 | 4,150 | 2,700 |
| Test I-B | | | |
| 100 | #1 | 25 | 32 |
| 170 | #7 | 24,800 | 18,960 |
| 185 | #7 | 68,800 | 38,080 |
| 200 | #6 | 27,300 | 15,480 |
| *200 (after final shear) | #6 | 15,150 | 7,820 |

*Indicates that the cereal flour-water mixture has been subjected to mechanical shear.

EXAMPLE II

This example illustrates the effect on the dry cereal porridge product of reducing the viscosity of the gelatinized cereal flour-water mixture by shearing prior to drum drying. Test II-A is in accordance with the present invention because the gelatinized cereal flour-water mixture has been subjected to mechanical shear to reduce its viscosity prior to drying. In Test II-B no mechanical shear is imparted to the gelatinized mixture prior to drum drying and thus Test II-B is not in accordance with the present invention.

In each test, a cereal flour-water slurry is prepared by admixing 200 pounds of cereal flour (34% oat flour, 33% wheat flour, 33% rice flour) having a U.S. Mesh size less than 30, 3 pounds of a dicalcium phosphate dihydrate and 50 pounds of water. After complete mixing, the cereal flour-water slurry is cooked by steam injection in a steam jacketed vessel equipped with low speed mixing blades. The injected steam pressure is 50 psig and the steam jacket pressure is at approximately 15 psig, until the cereal flour-water mixture reaches a temperature of 170° F. The steam injection pressure is then lowered to 5 psig until the mixture reaches a temperature of 200° F.

Test II-A and II-B differ in that the mixture in Test II-A is subjected to mechanical shear during the cooking step to reduce the viscosity of the gelatinized mixture whereas the mixture in Test-B is not subjected to mechanical shear. In Test II-A, the heating vessel is equipped with recycle pumps which continuously recycle the cereal flour-water mixture through a high speed impeller operating at 3,140 rpm to shear the mixture. The high speed impeller employed is a Tri-Blender by Ladish Co. As the mixture is sheared it is recycled back into the heating vessel and mixed with the cereal flour-water mixture in the vessel. Thus, the viscosity of the mixture in vessel is continuously being reduced.

In Test II-B, the mixture remains in the heating vessel, and is not subjected to mechanical shear.

The data listed on Table II provides a comparison of the viscosity of the gelatinized mixtures of Test II-A (shear) and Test II-B (no shear). The viscosities are measured on a RVT Brookfield viscometer at both 20 rpm and 50 rpm using spindle #6. It should be noted that mechanical shear provided to the mixture of Test II-A drastically reduced the viscosity in comparison to the viscosity of the non-sheared gelatinized mixture of Test II-B.

The gelatinized cereal flour-water mixtures prepared for Tests II-A and II-B are then dehydrated by drum drying. The drum drier is a conventional double drum drier having 12 inch radius drums. In order to accomodate the higher viscosity mixture of Test II-B and to provide comparable data a final dry flake product resulting from Test II-A and II-B, it was necessary to adjust the various operating parameters of the drum drier. The various operating parameters are provided for comparison on Table II under the headings "drum speed", "GAP", "steam pressure", "feed temperature" and "puddle depth".

After drum drying, the cereal sheets are pulverized and tested for color, density and reconstitution characteristics. The color is determined on a Hunter colorimeter using standard color testing techniques. The density was determined by bench measurements of weight to volume ratios. To measure the porridge reconstitution viscosity, 15 grams of dry cereal flakes are admixed for one minute with 180 milliliters of water at room temperature. The viscosity of the porridge is measured after standing 3 minutes. The reconstitution viscosity was measured on a RVT Brookfield viscometer using spindle #2 at 20 rpm.

While the cereal porridge flakes produced in Test II-A and II-B have comparable color, the density and reconstitution viscosity of the flake product produced in Test II-A (in accordance with the invention) are increased. The cereal flake density of the product of Test II-B is lower than that of Test II-A and thus a greater volume of flakes is porridge upon reconstitution.

TABLE II

| | Test II-A* | II-B |
|---|---|---|
| Gelatinized Mixture Viscosity (cps) | | |
| 20 rpm | 4600 | 38,200 |
| 50 rpm | 2880 | 18,760 |
| Drum Drier | | |
| Speed (rpm) | 4.8 | 8.6 |

TABLE II-continued

|  | Test | |
|---|---|---|
|  | II-A* | II-B |
| GAP (inches) | 0.0118 | 0.0083 |
| Steam Pressure (psig) | 80 | 80 |
| Feed Temperature (°F.) | 166 | 150 |
| Puddle Depth (inches) | 8 | 9 |
| Dry Product Characteristics | | |
| Color | 81.4 | 82.3 |
| Density (gm/ml) | 0.252 | 0.234 |
| Reconstitution Viscosity (cps) | 890 | 460 |

*In accordance with the present invention.

This example provides a comparison of the flake porridge product prepared in Test II-A of Example II (in accordance with the present invention) with a flake porridge product prepared from a gelatinized cereal flour-water mixture treated with enzyme to reduce the viscosity of the mixture.

In Test III-A, the slurry preparation and gelatinization/cooking process disclosed in Test II-A of Example II was employed except that the dicalcium phosphate dihydrate was admixed with 0.0264 pounds (0.053% based on the weight of the cereal flour) of α-amylase, and this mineral-enzyme mix was metered through the Tri-Blender into the gelatinized cereal flour-water mixture when the mixture was at a temperature of 170° F.

The enzyme treatment in combination with the mechanical shear drastically reduced the viscosity of the gelatinized cereal flour-water mixture. The data listed in Table III indicates the mixture viscosity as measured on a RVT Brookfield viscometer at 20 rpm and 50 rpm using spindle #6. The enzyme-reduced viscosity mixture was then drum dried. The operating parameters of the drum drier are listed on Table III.

After flaking, the density, color, and reconstitution viscosity are determined in accordance with the procedure set forth in Example II except that the reconstitution viscosity was measured using a #6 spindle.

It should be noted that the color of the enzyme-treated flake product of Test III-A (78.3) is substantially darker than the color of the flake product of Test II-A (81.4). The darker color is noticeable upon mere visual observance. Additionally, the reconstitution viscosity of the flake product of Test III-A is extremely low. The porridge product produced therefrom is "watery".

TABLE III

|  | Test III* |
|---|---|
| Gelatinized Mixture Viscosity (cps) | |
| 20 rpm | 6,000 |
| 50 rpm | 4,320 |
| Drum Drier | |
| Speed (rpm) | 8.5 |
| GAP (inches) | 0.012 |
| Steam Pressure (psig) | 44 |
| Feed Temperature (°F.) | 160 |
| Puddle Depth (inches) | 3 |
| Dry Product Characteristics | |
| Color | 78.3 |
| Density (Gm/ml) | 0.30 |
| Reconstitution Viscosity (cps) | 450 |

*not in accordance with the present invention

We claim:

1. A process for preparing a dry, gelatinized, cereal porridge product capable of being instantly prepared as a hot or cold cereal porridge comprising:
   a. preparing a slurry of cereal flour having a Mesh size less than U.S. Mesh size #40, and water in which the flour is present in an amount of from 14 to 30% inclusive based on the weight of the slurry;
   b. gelatinizing the cereal flour slurry by heating until such time as the gelatinized cereal flour-water mixture has achieved a temperature in the range 180°–212° F. and the viscosity of the gelatinized cereal mixture is greater than 20,000 cps as measured on a RVT Brookfield viscometer at 50 rpm using spindle #7;
   c. subjecting the gelatinized cereal mixture to mechanical shear of sufficient intensity and duration to reduce the viscosity of said gelatinized cereal mixture to a viscosity less than 10,000 cps as measured on a RVT Brookfield viscometer at 50 rpm using spindle #5 yielding a reduced viscosity gelatinized cereal mixture; and
   d. dehydrating on a drum drier the reduced viscosity cereal mixture to a moisture in the range 2.0 to 9.0% inclusive, and pulverizing the dehydrated material thereby forming the dry gelatinized cereal product.

2. The process of claim 1 in which the cereal flour comprises at least 20% oat flour.

3. The process of claim 1 wherein the moisture of the reduced viscosity cereal flour-water mixture is greater than 70%, based on the weight of the mixture.

4. The process of claim 1 wherein the flour is present in the slurry in an amount of from 15% to 22% inclusive based on the weight of the slurry.

5. The process of claim 1 wherein the reduced viscosity cereal mixture is dehydrated to a moisture in the range 2.0% to 6.0%, inclusive.

6. The process of claim 1 wherein the heating is achieved by direct steam injection into the slurry.

7. A process for preparing a dry, gelatinized, cereal porridge product capable of being instantly prepared as a hot or cold cereal porridge comprising:
   a. preparing a slurry of cereal flour having a Mesh size less than U.S. Mesh size #40, and water in which the flour is present in an amount of from 14 to 30% inclusive based on the weight of the slurry and in which the slurry viscosity is less than 100 cps as measured on a RVT Brookfield viscometer at 50 rpm using spindle #1;
   b. gelatinizing the cereal flour slurry by heating through the peak gelatinization viscosity in the range of 30,000 to 70,000 cps as measured on a RVT Brookfield viscometer at 50 rpm using spindle #7, until such time as the gelatinized cereal flour-water mixture has achieved a viscosity of less than one half of the peak gelatinization viscosity;
   c. subjecting the gelatinized cereal mixture to mechanical shear of sufficient intensity and duration to further reduce the viscosity of said gelatinized cereal mixture to a viscosity less than 10,000 cps as measured on a RVT Brookfield viscometer at 50 rpm using spindle #5, yielding a reduced viscosity gelatinized cereal mixture; and
   d. dehydrating on a drum drier the reduced viscosity cereal mixture to a moisture in the range 2.0 to 9.0% inclusive, and pulverizing the dehydrated material thereby forming the dry gelatinized cereal product.

* * * * *